United States Patent
Pfeiffer et al.

(10) Patent No.: US 9,095,789 B2
(45) Date of Patent: *Aug. 4, 2015

(54) REMOVAL OF IONIC LIQUIDS BY MEANS OF COALESCING FILTERS MADE FROM ACRYLIC/PHENOLIC RESIN

(71) Applicant: BASF SE, Ludwigshafen (DE)

(72) Inventors: Daniel Pfeiffer, Neustadt (DE); Stefan Bitterlich, Dirmstein (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,386

(22) Filed: Jul. 9, 2013

(65) Prior Publication Data

US 2014/0018598 A1    Jan. 16, 2014

Related U.S. Application Data

(60) Provisional application No. 61/670,136, filed on Jul. 11, 2012.

(51) Int. Cl.
*B01D 17/04* (2006.01)
(52) U.S. Cl.
CPC .................... *B01D 17/045* (2013.01)
(58) Field of Classification Search
CPC ........................................ B01D 17/02
See application file for complete search history.

(56) References Cited

U.S. PATENT DOCUMENTS

| | | | |
|---|---|---|---|
| 3,271,467 A | 9/1966 | Nakayama | |
| 3,406,217 A | 10/1968 | Davison et al. | |
| 6,503,465 B1 | 1/2003 | Lin et al. | |
| 2003/0109767 A1 | 6/2003 | Vasina et al. | |
| 2007/0017875 A1 | 1/2007 | Gramme et al. | |
| 2008/0269426 A1* | 10/2008 | Bitterlich et al. | 525/378 |

(Continued)

FOREIGN PATENT DOCUMENTS

| | | |
|---|---|---|
| DE | 10 2005 029423 A1 | 12/2006 |
| EP | 1503236 A1 | 2/2005 |

(Continued)

OTHER PUBLICATIONS

International Search Report for PCT/EP2013/064459 dated Sep. 12, 2013.

(Continued)

*Primary Examiner* — Tam M Nguyen
(74) *Attorney, Agent, or Firm* — Drinker Biddle & Reath LLP

(57) ABSTRACT

The present invention relates to a process for separating a phase (A) comprising at least one ionic liquid from a phase (B), phase (A) having a higher viscosity than phase (B), comprising the following steps:

a) providing a stream (S1) comprising a dispersion (D1) in which phase (A) is dispersed in phase (B),
b) introducing stream (S1) into a coalescing filter (K) manufactured from acrylic/phenolic resin,
c) separating the dispersed phase (A) from phase (B) in the coalescing filter (K),
d) discharging a stream (S2) comprising at least 70% by weight, preferably at least 90% by weight, of phase (A) from the coalescing filter (K), and
e) discharging a stream (S3) comprising at least 70% by weight, preferably at least 90% by weight, of phase (B) from the coalescing filter (K).

19 Claims, 1 Drawing Sheet

(56) References Cited

U.S. PATENT DOCUMENTS

| | | | |
|---|---|---|---|
| 2010/0130800 A1* | 5/2010 | Luo et al. ..................... | 585/446 |
| 2011/0137097 A1 | 6/2011 | Tschirschwitz et al. | |
| 2011/0137098 A1 | 6/2011 | Tschirschwitz et al. | |
| 2011/0155632 A1 | 6/2011 | Timken et al. | |
| 2011/0155640 A1 | 6/2011 | Timken et al. | |

FOREIGN PATENT DOCUMENTS

| | | | |
|---|---|---|---|
| WO | WO-2010062922 A2 | 6/2010 | |
| WO | WO-2010074836 A2 | 7/2010 | |
| WO | WO-2010075038 A2 | 7/2010 | |
| WO | WO-2011069929 A1 | 6/2011 | |
| WO | WO-2011069957 A1 | 6/2011 | |
| WO | WO-2012104769 A1 | 8/2012 | |

OTHER PUBLICATIONS

International Preliminary Report on Patentability for PCT/EP2013/064459 dated Jul. 14, 2014.
U.S. Appl. No. 61/438,686, filed Feb. 2, 2011.
U.S. Appl. No. 61/670,130, filed Jul. 11, 2012.
U.S. Appl. No. 61/670,131, filed Jul. 11, 2012.
U.S. Appl. No. 61/670,132, filed Jul. 11, 2012.
U.S. Appl. No. 61/670,133, filed Jul. 11, 2012.
U.S. Appl. No. 61/670,134, filed Jul. 11, 2012.
U.S. Appl. No. 61/670,135, filed Jul. 11, 2012.
U.S. Appl. No. 61/670,140, filed Jul. 11, 2012.
U.S. Appl. No. 61/670,142, filed Jul. 11, 2012.

* cited by examiner

REMOVAL OF IONIC LIQUIDS BY MEANS OF COALESCING FILTERS MADE FROM ACRYLIC/PHENOLIC RESIN

CROSS-REFERENCE TO RELATED APPLICATIONS

This patent application claims the benefit of pending U.S. provisional patent application Ser. No. 61/670,136 filed Jul. 11, 2012, incorporated in its entirety herein by reference.

The present invention relates to a process for separating a phase (A) comprising at least one ionic liquid from a phase (B) in a coalescing filter (K) made from acrylic/phenolic resin, phase (A) having a higher viscosity than phase (B).

Ionic liquids are suitable, inter alia, as catalysts for the isomerization of hydrocarbons. A corresponding use of an ionic liquid is disclosed, for example, in WO 2011/069929, where a specific selection of ionic liquids is used in the presence of an olefin for isomerization of saturated hydrocarbons, more particularly for isomerization of methylcyclopentane (MCP) to cyclohexane.

In general, ionic liquids on the one hand and hydrocarbons (or organic phases in general) on the other hand are immiscible or only of very limited miscibility; they form two separate phases. In order to be able to utilize this catalytic action, intensive contact has to be established between organic phase and the ionic liquid. For this purpose, the two phases are frequently mixed in stirred tanks with vigorous stirring to obtain dispersions. Depending on parameters such as the nature of the ionic liquid or of the organic phase or the phase ratio, the dispersion may either be in the form of a dispersion of an ionic liquid in the organic phase or may be a dispersion of the organic phase in the ionic liquid. Irrespective of the specific direction of dispersion, it is a general problem in the case of such dispersions to remove the dispersed phase from the continuous phase after the reaction. A particularly problematic situation is that where the ultrafine droplets of the ionic (d<900 μm) liquid are to be separated from a dispersion in which the ionic liquid is dispersed in the organic phase (ultrafine droplet problem).

For separation of bi- or polyphasic mixtures, especially of dispersions, the use of coalescing filters has long been known. For example, international application PCT/IB2012/050417 (filed Jan. 30, 2012) discloses a process for reducing the water content in pyrolysis gasoline using a coalescing filter manufactured from metal and/or glass fiber. A coalescing filter, however, can be used not just for water removal from mixtures (dispersions) having an organic phase (pyrolysis gasoline), but also for removal of ionic liquids from dispersions comprising an organic phase.

WO 2010/062922 discloses a multistage process for separating an ionic liquid from hydrocarbons using a coalescing filter. The characteristics of the coalescing filter material must be such that it has a stronger affinity for the ionic liquid than for the hydrocarbons. Suitable coalescing filter materials according to WO 2010/062922 are glass beads, stainless steel, glass fibers, polymer fibers or organic membranes, especially glass fibers. In the coalescing filter, separation of the ionic liquid from the hydrocarbons is accomplished.

It is an object of the present invention to provide a novel process for separating an ionic liquid from an organic phase, the ionic liquid being dispersed in the organic phase.

The object is achieved by a process for separating a phase (A) comprising at least one ionic liquid from a phase (B), phase (A) having a higher viscosity than phase (B), comprising the following steps:

a) providing a stream (S1) comprising a dispersion (D1) in which phase (A) is dispersed in phase (B),
b) introducing stream (S1) into a coalescing filter (K) manufactured from acrylic/phenolic resin,
c) separating the dispersed phase (A) from phase (B) in the coalescing filter (K),
d) discharging a stream (S2) comprising at least 70% by weight, preferably at least 90% by weight, of phase (A) from the coalescing filter (K), and
e) discharging a stream (S3) comprising at least 70% by weight, preferably at least 90% by weight, of phase (B) from the coalescing filter (K).

A BRIEF DESCRIPTION OF THE FIGURES

DETAILED DESCRIPTION OF THE INVENTION

Figure 1:
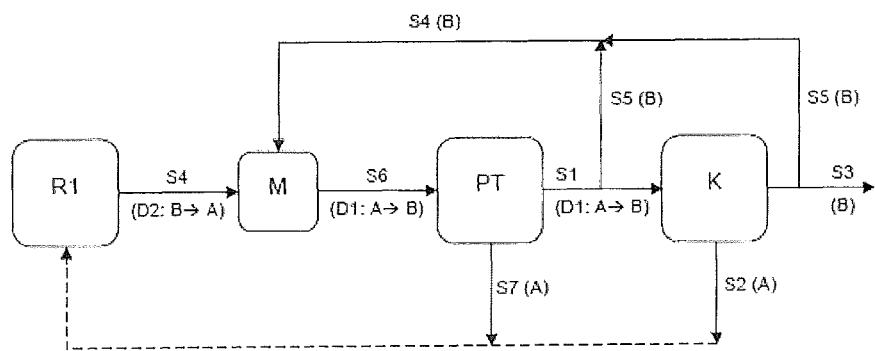
FIG. 1 shows an exemplary embodiment of the process according to the invention.

The coalescing filters made from acrylic/phenolic resin used feature, in the first instance, (under the boundary conditions of relevance for the present process) greater stability as opposed to other coalescing filters (for example polyphenylene sulfide) and/or maintenance of their (separation) performance (coalescing action) over a longer period.

The process according to the invention can advantageously achieve effective separation of ionic liquids from dispersions comprising organic phases, especially from dispersions comprising hydrocarbons. According to the invention, more particularly, the problem of the removal of ionic liquid present in finely dispersed form and/or in small amounts in a dispersion comprising an organic phase can be solved (ultrafine droplet problem).

It is possible through the process according to the invention to separate even relatively small amounts (<1% by weight) of ionic liquid from a dispersion comprising an organic phase, especially comprising a hydrocarbon phase; more particularly, this is also true in the case that a direction of dispersion of ionic liquid in organic phase is present. By controlling the direction of dispersion of phase (A; ionic liquid) in phase (B; organic phase), a high (rapid) separation rate can be achieved, with the consequence that the size of the phase separators used in the process can be distinctly reduced compared to the case of the reverse direction of dispersion—phase (B; organic phase) in phase (A; ionic liquid).

The process according to the invention can thus be conducted irrespective of the direction of dispersion in the preceding process steps. If, for example, in a preceding isomerization step, a direction of dispersion with phase (B) in phase (A) is present because, for example, a distinct excess of ionic liquid is used in the isomerization, in a preferred embodiment of the present invention, inversion of the direction of dispersion can be conducted without any problem. The inversion of the direction of dispersion is conducted in accordance with the invention by recycling a stream comprising an excess of organic phase upstream of the coalescing filter made from acrylic/phenolic resin and especially also upstream of an additional phase separator connected upstream of the coalescing filter.

The process according to the invention for removal of ionic liquids by means of coalescing filters made from acrylic/phenolic resin is defined in detail hereinafter.

Phase (A) comprises at least one ionic liquid. For example, phase (A) may comprise mixtures of two or more ionic liquids; phase (A) preferably comprises one ionic liquid. As well as the ionic liquid, phase (A) may also comprise further components miscible with the ionic liquid. Such components may, for example, be cocatalysts which are used in isomerization reactions using ionic liquids. A preferred example of such cocatalysts is hydrogen halides, especially hydrogen chloride. In addition, phase (A) may also comprise constituents or decomposition products of the ionic liquids which can form, for example, in the course of the reaction catalyzed by the ionic liquid, such as aluminum chloride. Preferably, in phase (A), the proportion of ionic liquid is greater than 80% by weight (based on the sum of all components of phase (A)).

Suitable ionic liquids in the context of the present invention are in principle all ionic liquids known to those skilled in the art, provided that they catalyze the reaction to be conducted, for example isomerization. An overview of ionic liquids suitable for catalysis of isomerization reactions can be found, for example, in WO 2011/069929. Preference is given in the context of the present invention to an acidic ionic liquid. The ionic liquid present in phase (A) is preferably an acidic ionic liquid having the composition $K1Al_nX_{(3n+1)}$ where K1 is a monovalent cation, X is halogen and $1<n<2.5$. K1 is preferably an unsubstituted or at least partly alkylated ammonium ion or a heterocyclic (monovalent) cation, especially a pyridinium ion, an imidazolium ion, a pyridazinium ion, a pyrazolium ion, an imidazolinium ion, a thiazolium ion, a triazolium ion, a pyrrolidinium ion, an imidazolidinium ion or a phosphonium ion. X is preferably chlorine or bromine.

The acidic ionic liquid more preferably comprises, as a cation, an at least partly alkylated ammonium ion or a heterocyclic cation and/or, as an anion, a chloroaluminate ion having the composition $Al_nCl_{(3n+1)}$ where $1<n<2.5$. The at least partly alkylated ammonium ion preferably comprises one, two or three alkyl radicals (each) having 1 to 10 carbon atoms. If two or three alkyl substituents are present with the corresponding ammonium ions, the respective chain length can be selected independently; preferably, all alkyl substituents have the same chain length. Particular preference is given to trialkylated ammonium ions having a chain length of 1 to 3 carbon atoms. The heterocyclic cation is preferably an imidazolium ion or a pyridinium ion.

The acidic ionic liquid especially preferably comprises, as a cation, an at least partly alkylated ammonium ion and, as an anion, a chloroaluminate ion having the composition $Al_nCl_{(3n+1)}$ where $1<n<2.5$. Examples of such particularly preferred ionic liquids are trimethylammonium chloroaluminate and triethylammonium chloroaluminate.

In the context of the present invention, phase (A) has a higher viscosity than phase (B). The viscosity of phase (A) is preferably at least 0.1 mPas and especially at least 20 mPas higher than that of phase (B).

In the context of the present invention, a first characteristic of phase (B) is that it has a lower viscosity than phase (A). For example, phase (B) may be an organic phase. Phase (B) preferably comprises at least one hydrocarbon. Phase (B) more preferably comprises, as the hydrocarbon, cyclohexane or a mixture of cyclohexane with at least one further hydrocarbon selected from methylcyclopentane (MCP), n-hexane, isohexane, n-heptane, isoheptane or dimethylcyclopentane. Phase (B) especially preferably comprises a mixture of cyclohexane, MCP and at least one further hydrocarbon.

In the context of the present invention, in step a), a stream (S1) comprising a dispersion (D1) in which phase (A) is dispersed in phase (B) is provided. The direction of dispersion (i.e. the information as to which phase is in disperse form in the respective other phase) can be determined by examining a sample, optionally after addition of a dye which selectively stains one phase, under a transmitted light microscope.

Dispersion (D1) can be produced by methods known to those skilled in the art; for example, such a dispersion can be obtained by vigorous stirring of the components present in the respective phases. Such an operation can take place, for example, in the course of an isomerization process of hydrocarbon using an ionic liquid. Dispersion (D1) is (as explained in detail hereinafter) preferably withdrawn as the upper phase from a phase separation apparatus, which is especially preferably connected downstream of an apparatus in which a reaction catalyzed by the ionic liquid is conducted and in which the ionic liquid and the organic phase are contacted with stirring. In the dispersion (D1), phases (A) and (B) may be present in any desired ratios relative to one another, provided that phase (A) is dispersed in phase (B). Preferably, phase (A) is present to a maximum extent of 10% by weight, especially to a maximum extent of 5% by weight, in stream (S1) in dispersion (D1) (based in each case on the amount of phase (B)).

In step b) of the invention, stream (S1) is introduced into a coalescing filter (K) manufactured from acrylic/phenolic resin. Suitable coalescing filters (K) are known to those skilled in the art; they are commercially available, for example, from Fuhr GmbH (Germany) or from the manufacturer CUNO Fluid Purification. Such suitable coalescing filters (K) have finenesses of 1-150 µm, preferably 10, 25 or 50 µm, especially preferably 10 µm. In addition, two versions are possible with respect to the surface: grooved and ungrooved; ungrooved is preferred. The cartridges of the coalescing filter (K) as such preferably have an internal diameter of 27 mm and an external diameter of 65 mm and are available in lengths of 4" to 60". The cartridge is preferably an asymmetric, resin-bonded filter cartridge with no support core. It preferably comprises essentially acrylic fibers bonded with phenolic resin.

As evident, for example, from the working example of the present invention, the coalescing filter (K) can be integrated into a larger unit, for example a filter vessel. In the context of the present invention, a coalescing filter (K) manufactured from acrylic/phenolic resin is preferably understood to mean the filter material as such. The other components of the filter unit, for example the vessel of the unit (filter vessel) or the filter module into which the filter material has been introduced may be manufactured from materials other than acrylic/phenolic resin. The expression "manufactured from" in the context of the present invention means that the material used for production of the filter material comprises acrylic/phenolic resin. The filter material preferably comprises at least 50% by weight, more preferably at least 75% by weight and especially at least 95% by weight of acrylic/phenolic resin.

In step c), the dispersed phase (A) is separated from phase (B) in the coalescing filter (K). The performance of the separation as such—the coalescing action of the coalescing filter (K) giving phases (A) and (B) separated from one another—by means of a coalescing filter (K) is known to those skilled in the art.

According to step d), in the process of the invention, a stream (S2) comprising at least 70% by weight, preferably at least 90% by weight, of phase (A) is discharged from the coalescing filter (K). Especially preferably, only small amounts of phase (B), if any, are present in stream (S2) (<1% by weight). The above figures in % by weight are based on the corresponding amounts present in stream (S1).

In step e), a stream (S3) comprising at least 70% by weight, preferably at least 90% by weight, of phase (B) is discharged from the coalescing filter (K). Especially preferably, only small amounts of phase (A), if any, are present in stream (S2) (<1% by weight). The above figures in % by weight are based on the corresponding amounts present in stream (S1).

The stream (S1) provided in step a) is preferably obtained from a phase separation unit connected upstream of the coalescing filter (K). This phase separation unit is preferably a phase separator. In addition, the phase separation unit is preferably connected downstream of a reaction apparatus or a cascade of reaction apparatuses. This reaction apparatus or cascade of reaction apparatuses preferably comprises apparatus which are suitable for conducting an isomerization of hydrocarbons in the presence of at least one ionic liquid as a catalyst.

In a preferred embodiment of the present invention, in addition to the above-described steps a) to e), the following additional steps f) to k) are conducted, these being defined as follows:

f) discharging a stream (S4) from the reaction apparatus or the cascade of reaction apparatuses, (S4) comprising a dispersion (D2) in which phase (B) is dispersed in phase (A), g) introducing a stream (S5) comprising at least 70% by weight, preferably at least 90% by weight, of phase (B), into stream (S4), stream (S5) being recycled from step k), preference being given to mixing streams (S4) and (S5) by means of a return element or of a static mixer, h) to form a stream (S6) comprising a dispersion (D1) in which phase (A) is dispersed in phase (B), i) introducing stream (S6) into the phase separation unit connected upstream of the coalescing filter (K), j) separating stream (S6) in the phase separation unit into a stream (S1) according to step a), and into a stream (S7) comprising at least 70% by weight, preferably at least 90% by weight, of phase (A), k) removing a portion of stream (S1) and/or a portion of stream (S3) according to step e) as stream (S5) and recycling stream (S5) to step g).

In the context of the present invention, stream (S5) which is introduced into stream (S4) in step g) can be formed from a portion of stream (S1). Alternatively, stream (S5) can also be formed from a portion of stream (S3). Optionally, stream (S5) can also be formed from different or identical portions of streams (S1) and (S3). Stream (S5) is preferably formed from a portion of stream (S1). For example, between 50 and 90% of streams (S1) and/or (S3) are removed as stream (S5) and recycled into stream (S4). However, it is also conceivable that, at least temporarily, larger amounts or the corresponding streams are even recycled completely. The recycling of portions of streams (S1) and/or (S3) as stream (S5) and the associated introduction of stream (S5) into stream (S4) achieves inversion of the direction of dispersion in stream (S4). Inversion of the direction of dispersion means that stream (S4) comprises a dispersion (D2) in which phase (B) is dispersed in phase (A), and suitable selection of the amount of stream (S5) in step g) results in formation of a stream (S6) comprising dispersion (D1) in which phase (A) is dispersed in phase (B). If a phase separation unit, especially a phase separator, is connected upstream of the coalescing filter (K), the proportion of phase (A) in dispersion (D1) is reduced further, which has an advantageous effect on the separation performance of the coalescing filter (K).

Preferably, in step g), stream (S5) is introduced into stream (S4) in a stirring or mixing apparatus in which stream (S6) according to step h) is formed.

It is additionally preferable that the phase ratio of phase (A) to phase (B) in dispersion (D1) present in stream (S6) is ≤3 [kg/kg], preferably ≤0.9 [kg/kg].

It is additionally preferable that stream (S4) is obtained from an isomerization in the presence of an ionic liquid, especially an isomerization of methylcyclopentane (MCP) to cyclohexane in the presence of an ionic liquid.

It is additionally preferable that, in step k), stream (S5) is removed from stream (S1) outside the phase separation unit.

Optionally, stream (S7) removed from the phase separation unit according to step j) and/or stream (S2) discharged from the coalescing filter (k) according to step d), each of which comprises phase (A), can be recycled into the reaction apparatus or the cascade of reaction apparatuses. Optionally, stream (S7) and/or stream (S2) can also be recycled to another point in the process according to the invention, for example into a mixing or stirring apparatus, in order to control the concentration of phase (A) in dispersion (D1).

In the context of the present invention, cyclohexane is preferably isolated from stream (S3). Processes and apparatuses for removal of cyclohexane from stream (S3), especially when it is a hydrocarbon mixture, are known to those skilled in the art. Optionally, prior to the removal of the cyclohexane, further purification steps (for example a wash with an aqueous and/or alkaline phase) can be conducted, these being known to those skilled in the art.

FIG. 1 once again illustrates the process according to the invention (in a configuration) of the preferred embodiment described above. According to FIG. 1, the process is performed by recycling a portion both from stream (S1) and from stream (S3) as stream (S5) into stream (S4). For better understanding, FIG. 1 states the main components present in each of the streams in brackets below each of them. For streams (S1), (S4) and (S6), the respective expression in brackets also includes the direction of dispersion of the respective dispersions, the arrow expressing the direction of dispersion. This means that, for example, dispersion (D2) present in stream (S4) has a phase (B) dispersed in phase (A). In FIG. 1, stream (S5) is introduced into stream (S4) in a mixing apparatus (M). The broken line indicates that streams (S7) and/or (S2) can optionally also be recycled into the reaction apparatus or a cascade of reaction apparatuses (R1). PT in FIG. 1 means "phase separation unit" and K means "coalescing filter".

The invention is illustrated hereinafter by means of examples.

EXAMPLES

For the experiment, the following substances are used:

Phase (A):

ionic liquid (IL) with the composition $(CH_3)_3NH$ $Al_nCl_{3n+1}$ where n=1.82 according to elemental analysis (also referred to as IL phase).

Phase (B):

hydrocarbon mixture with the composition (also referred to as organic phase)

methylcyclopentane 20% by weight cyclohexane 50% by weight hexane 28% isohexanes (technical mixture) 2% by weight

For the experiments described, phases (A) and (B) are used in a ratio of 0.1 kg(A)/kg(B).

1. Comparison of Organic Filter Materials with Respect to Stability

For this experiment, two filter materials, in each case after removal of the support grid manufactured from stainless steel, are immersed into a stirred biphasic mixture of the aforementioned substances (A) and (B) and left therein at room temperature for 20 h.

The results of the storage test are as follows:

| Filter material | Appearance after storage in IL |
|---|---|
| PALL Profile RLS1FPS100 10 μm (polyphenylene sulfide) | dark discoloration in places (green spots) |
| acrylic/phenolic resin (from Fuhr GmbH) 10 μm, ungrooved | unchanged - |

2. Filtration Test with the Acrylic/phenolic Resin Filter

Figure 2:
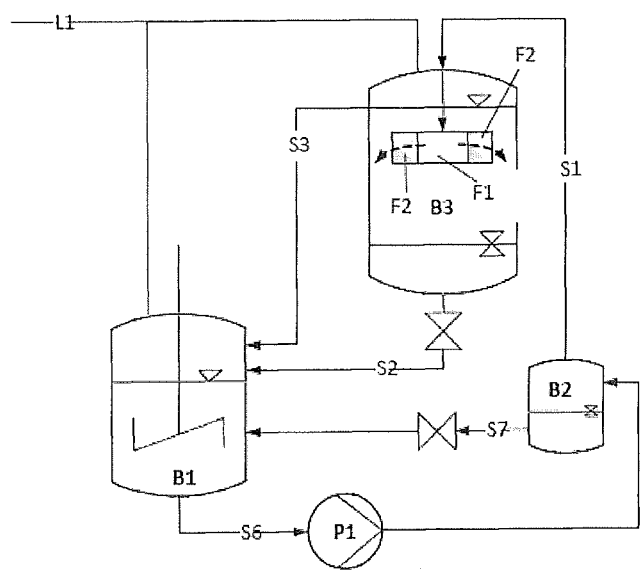
FIG. 2 shows an experimental arrangement for a filtration test with an acrylic/phenolic resin filter.

The experimental arrangement is shown in the figure according to FIG. 2:

Vessel (B1) (2.5 l stirred vessel with glass disk stirrer, stirred at 1000 rpm) is initially charged with a biphasic mixture of (A) and (B), with (A) dispersed in (B). B1 is (like B3 too) connected to a nitrogen-conducting gas line (L1) which is kept at atmospheric pressure.

By means of the metering pump (P1), dispersion (D1) is conducted as stream (S6) into a phase separator (B2). Here, a rough separation takes place between phases (A) and (B). Phase (A) is recycled via stream 7 to B1, the valve in stream 7 being adjusted such that the phase boundary between (A) and (B) persists at about a constant level over the experiment duration. Stream (S1) consisting of phase (B) apart from a small amount of extraneous phase (see below) is conducted through the interior of the filter module (F1) and the filter material (F2) into the filter vessel (B3) The filter module comprises the acrylic/phenolic resin filter material according to the description under experiment 1 as a ring of rectangular cross section (height 3 cm, diameter 5 cm), surrounded by a support grid manufactured from stainless steel and held together with the latter by means of a screw device between two profiled Teflon sheets. Stream (S1) flows through a feed line into the cavity formed by the filter material and the holder sheets and thence radially outward into the filter vessel. The two liquid phases obtained therein are returned to B1 via an overflow (stream (S3), organic phase) or a manually controlled valve (stream (S2), IL phase). The pressure differential between inside and outside of the filter module is measured.

All vessels are equipped with a jacket and are kept at 50° C. by means of a heat carrier oil circulated through a laboratory thermostat during the experiments described below.

At first, stream (S3) is set to 5 l/h for 1 h. From the filter, droplets of the heavier phase (phase rich in (A)) having a diameter of 1 to 2 mm emerge. The pressure drop over the filter module is below 500 mbar. The valve in stream (S2) remains closed within this period, such that approx. 250 ml of heavy phase collects in the lower part of B3; the phase boundary at the end of this period is still below the filter module.

Thereafter, the pump is stopped and the filter module is left in the organic phase for 10 days. Thereafter, B1 is emptied and refilled with the above-described dispersion (D1) composed of (A) and (B).

Thereafter, P1 is put back into operation. Two different feed rates to the filter (stream (S1)) are set. The valve in stream (S2) is set in each case such that the level of the phase boundary in B3 remains constant. After 20 min, samples are taken from the feed stream to the filter (stream (S1)) and analyzed for their nitrogen content. The size of the droplets of the heavy phase emerging from the filter is estimated visually.

The results are shown in the following table:

| Flow rate (S1) [l/h] | Pressure drop Filter [mbar] | Size of droplet phase (A) after filter [mm] | N content [ppm by wt.] | |
|---|---|---|---|---|
| | | | Stream (S1) | Org. phase |
| 4.8 | 0 | 2-3 | 65 | 7 |
| 8.1 | 0 | 3 | 65 | 17 |

The results show that the acrylic/phenolic resin filter tested is stable and also effective for the duration of the experiment (the nitrogen content in the organic phase in B2 or in stream (S3) is a measure of the contamination of organic phase with IL extraneous phase downstream of the filter).

The invention claimed is:

1. A process for separating a phase (A) comprising at least one ionic liquid from a phase (B), phase (A) having a higher viscosity than phase (B), comprising the following steps:
   a) providing a stream (S1) comprising a dispersion (D1) in which phase (A) is dispersed in phase (B),
   b) introducing stream (S1) into a coalescing filter (K) manufactured from acrylic and phenolic resin,
   c) separating the dispersed phase (A) from phase (B) in the coalescing filter (K),
   d) discharging a stream (S2) comprising at least 70% by weight of phase (A) from the coalescing filter (K), and
   e) discharging a stream (S3) comprising at least 70% by weight of phase (B) from the coalescing filter (K).

2. The process according to claim 1, wherein in step d) the stream (S2) comprises at least 90% by weight of phase (A) or in step e) the stream (S3) comprises at least 90% by weight of phase (B).

3. The process according to claim 1, wherein the viscosity of phase (A) is at least 0.1 mPas higher than that of phase (B).

4. The process according to claim 1, wherein phase (B) comprises at least one hydrocarbon.

5. The process according to claim 4, wherein phase (B) comprises, as the hydrocarbon, cyclohexane or a mixture of cyclohexane with at least one further hydrocarbon selected from methylcyclopentane (MCP), n-hexane, isohexane, n-heptane, isoheptane or dimethylcyclopentane.

6. The process according to claim 1, wherein the ionic liquid present in phase (A) is an acidic ionic liquid having the composition $K1Al_nX_{(3n+1)}$ where K1 is a monovalent cation, X is halogen and $1<n<2.5$.

7. The process according to claim 6, wherein the acidic ionic liquid comprises, as a cation, an at least partly alkylated ammonium ion or a heterocyclic cation or, as an anion, a chloroaluminate ion having the composition $Al_nCl_{(3n+1)}$ where $1<n<2.5$.

8. The process according to claim 1, wherein phase (A) is present to a maximum extent of 5% by weight in stream (S1) in dispersion (D1).

9. The process according to claim 1, wherein stream (S1) is obtained from a phase separation unit which is connected upstream of the coalescing filter and which is in turn connected downstream of a reaction apparatus or a cascade or reaction apparatuses.

10. The process according to claim 9, wherein the phase separation unit is a phase separator.

11. The process according to claim 9 comprising the following additional steps:
   f) discharging a stream (S4) from the reaction apparatus or the cascade of reaction apparatuses, (S4) comprising a dispersion (D2) in which phase (B) is dispersed in phase (A), g) introducing a stream (S5) comprising at least 70% by weight of phase (B), into stream (S4), stream (S5) being recycled from step k), h) to form a stream (S6) comprising a dispersion (D1) in which phase (A) is dispersed in phase (B), i) introducing stream (S6) into the phase separation unit connected upstream of the coalescing filter (K), j) separating stream (S6) in the phase separation unit into a stream (S1) according to step a) and into a stream (S7) comprising at least 70% by weight of phase (A), k) removing a portion of stream (S1) or a portion of stream (S3) according to step e) as stream (S5) and recycling stream (S5) to step g).

12. The process according to claim 11, wherein, in step g), stream (S5) is introduced into stream (S4) in a stirring or mixing apparatus in which stream (S6) according to step h) is formed.

13. The process according to claim 11, wherein the phase ratio of phase (A) to phase (B) in dispersion (D1) present in stream (S6) is ≤3 [kg/kg].

14. The process according to claim 13, wherein the phase ratio is ≤0.9 [kg/kg].

15. The process according to claim 11, wherein stream (S4) is obtained from an isomerisation.

16. The process according to claim 15, wherein the isomerisation is an isomerization of methylcyclopentane (MCP) to cyclohexane in the presence of an ionic liquid.

17. The process according to claim 11, wherein, in step k), stream (S5) is removed from stream (S1) outside the phase separation unit.

18. The process according to claim 1, wherein cyclohexane is isolated from stream (S3).

19. The process according to claim 1, wherein the coalescing filter (K) comprises a cartridge comprising acrylic fibers bonded with phenolic resin.

* * * * *